United States Patent
Franklin et al.

(10) Patent No.: US 10,729,145 B2
(45) Date of Patent: Aug. 4, 2020

(54) SANDWICHING DEVICE

(71) Applicant: PBJLA Holdings LLC, Los Angeles, CA (US)

(72) Inventors: James Franklin, Los Angeles, CA (US); Robert Franklin, Sparta, NJ (US)

(73) Assignee: PBJLA HOLDINGS LLC, Los Angeles, CA (US)

( * ) Notice: Subject to any disclaimer, the term of this patent is extended or adjusted under 35 U.S.C. 154(b) by 306 days.

(21) Appl. No.: 15/976,505

(22) Filed: May 10, 2018

(65) Prior Publication Data

US 2018/0325122 A1    Nov. 15, 2018

Related U.S. Application Data

(60) Provisional application No. 62/504,951, filed on May 11, 2017.

(51) Int. Cl.
*A21C 9/06* (2006.01)
*A21D 13/32* (2017.01)
*A21C 15/02* (2006.01)

(52) U.S. Cl.
CPC ............ *A21C 9/068* (2013.01); *A21C 15/025* (2013.01); *A21D 13/32* (2017.01)

(58) Field of Classification Search
CPC ....... A21C 9/066; A21C 11/02; A21C 11/004; A21C 11/006; A21C 9/068; A21C 15/025; A21D 13/32
USPC .................................................... 99/432, 439
See application file for complete search history.

(56) References Cited

U.S. PATENT DOCUMENTS

| | | | |
|---|---|---|---|
| 4,759,706 A * | 7/1988 | Damianakos | A21C 9/068 249/170 |
| 6,004,596 A | 12/1999 | Kretchman et al. | |
| 2001/0009685 A1 | 7/2001 | Kretchman et al. | |
| 2001/0012532 A1 | 8/2001 | Kretchman et al. | |
| 2001/0016221 A1 | 8/2001 | Kretchman et al. | |
| 2003/0064136 A1 | 4/2003 | Kretchman et al. | |
| 2004/0180116 A1 | 9/2004 | Kretchman et al. | |
| 2006/0123997 A1 * | 6/2006 | Hubener | A21C 9/068 99/426 |

FOREIGN PATENT DOCUMENTS

FR    3017512 A1 *  8/2015  ............. A21C 9/066

OTHER PUBLICATIONS

Machine Translation of FR 3017512 A1 (Year: 2015).*

* cited by examiner

*Primary Examiner* — Christopher J Besler
(74) *Attorney, Agent, or Firm* — Cislo & Thomas, LLP

(57) ABSTRACT

A sandwiching device for creating pocket sandwich-type food, the sandwiching device having a stand, a lever mechanism attached to the stand, a punch attached to the lever mechanism, a die attached to the stand and positioned below the punch, and a sealer seated within the die. The lever mechanism is used to lower the punch and press the punch against the die and the sealer. When foodstuff is placed on the die, pressing the punch against the die and the sealer simultaneously cuts the crust off the foodstuff while sealing the edges of the foodstuff to create a pocket sandwich. To facilitate the sealing, the perimeter edge of the sealer may have a scalloped edge.

18 Claims, 10 Drawing Sheets

SANDWICHING DEVICE

CROSS-REFERENCE TO RELATED APPLICATIONS

This patent application claims the benefit of U.S. Provisional Patent Application Ser. No. 62/504,951, entitled "Sandwich Crimper-Decruster," filed May 11, 2017, which application is incorporated in its entirety here by this reference.

BACKGROUND

Field of Use

This invention relates to a device for sandwiching foodstuff, and particular sealing and decrusting sandwiches.

Background

This invention is an improvement on crimp tools known to be in the market. The sandwich sealer/decruster described herein was created to improve the process of cutting off bread-crust (decrusting) from two slices of bread containing foodstuff therebetween, while simultaneously sealing together these newly-crustless slices of bread at their outer edges (sealing). There were, however, problems with the sealing/decrusting devices in the prior art in accomplishing this process, including: 1) the significant amount of effort needed to press down hard enough to cut through any chewy bread and accomplish the sealing/decrusting task, 2) the undesirable tearing of bread between the sealed edges and the sealed bread toward the center because of a hollow space in prior art machines that allowed for the bread (and its filling) in the center of the tool, 3) the difficulty in removing the crimped sandwich from the tool (one would have to pry it out from the sides), especially with chewy breads, and 4) residual bread getting caught in between the sharp edges that is difficult to clean out of the tool because of the gear-like teeth in the prior art (or complete lack of teeth which does not create a very well-sealed edge) used to compress the edge and create a binding seal between two slices of bread.

Therefore, there is a need for a new device that easily and efficiently removes the perimeter edge and seals foodstuff, and allows for easy removal of the foodstuff after being cut and sealed.

SUMMARY OF THE INVENTION

These issues have been addressed as follows: 1) a sealer-decruster tool that attaches to stock press mechanisms (such as existing juice presses) and can also be applied to custom press mechanisms of similar type creating leverage in which even a child could apply enough force to the arm of the press to cut and seal a sandwich, 2) a solid dome surface at the center of the device that not only keeps the soft unsealed part of the bread from tearing away from the sealed edges, but also compresses the sandwich and the ingredients inside the two slices of bread to conform to a specified mold, thereby, evenly distributing the ingredients and creating a consistent, specific shape every time the device is used, 3) a scalloped sealing edge instead of a gear-tooth edge (or a flat edge, which does not create a strong seal) which negates the tendency of the bread to become caught in the tool, or for crumbs and residue to be difficult to remove from the tool, 4) a sealing edge that ejects from the bottom so that there is no need to pry the sealed sandwich from the die or the sealer, thus eliminating the issue of potentially breaking the newly formed sandwiches.

This solid dome structure can be interchanged with similar objects having a variety of different shapes, such as a heart-shaped mold.

The sandwich sealer described herein was invented to improve the prior art of cutting off bread-crust from two slices of bread containing foodstuffs, while simultaneously sealing together these newly-crustless slices of bread at their outer edges. In order to accomplish this function in an efficient and consistent pace for commercial productivity (i.e., in restaurants, food trucks, or the like), improvements were necessary.

The invention described herein comprises a lever which, when pulled, creates a forceful closing of an attached punch, which is held in line with a circular formed die containing a cutting edge in position to contact the punch upon closure.

The crust of the assembled bread sandwich, which is being supported upon the die, is then cut from the sandwich, falling away from the assembly into an optional receptacle operatively connected to the main device (receptacle not shown).

Preferably, by creating solid, opposing hemispherical shapes, like the interior shapes of the die and punch—the parts create a ravioli-like mold of both the contents and bread together, providing the finished product additional functional value—by controlling the contents of the sandwich, creating a consistent form to the sandwich and by greatly reducing bread-tearing seen in most prior art. This molding and compression of the bread, and its applied contents, also provides the ability to create variations in future designs in order to mold fun, whimsical, or other shapes such as a heart-shaped sandwich, while providing the exact functionality, as mentioned above.

A third component of this mechanism, the sealer is cradled within the die and allowed to "float" within its center upon a resilient device, such as a spring or cushion, beneath the sealer, preferably maintaining a height of its top edge just above the cutting edge of the die. The outer circumference, the edge of the sealer preferably has a circular, fluted "sinewave-like" form, which was found to best seal the sandwich edges of the top and bottom breads together without the bread either getting caught in the "gear-teeth" (as in the prior art), and also without the weaker seal that was prevalent in prior art devices that attempted to avoid that same problem by simply using a flat crimp edge.

After this cut and sealing ("de-crusting and sealing") operation is completed, the lever mechanism which has forced this assembly to cut and seal the sandwich is raised, enabling the sealer to be elevated by the spring or "cushion" beneath it, allowing easy access to remove the completed sandwich from the sandwich sealer and decruster.

By way of example only, one may apply peanut butter and jelly, tuna salad, or the like between two slices of bread, slip the sandwich into the device described herein, and pull down the lever. The flat round edge of the punch descends, compressing the bread between itself and circular knife and scalloped sealing edge. The crust is thus removed and falls to the counter or an optional receptacle, as the bread and its ingredients are molded and sealed inside the dome structure into a ravioli-like shape. The sealed sandwich can then be removed from the device because the sealing edge is separate from the circular cutting edge that surrounds it. This also allowed to the device to be optionally fitted with a cushioned bushing for the seal edge so that it may naturally adjust its counter-pressure breads of different thickness, firmness, or the like.

DETAILED DESCRIPTION OF THE INVENTION

Figure 1:
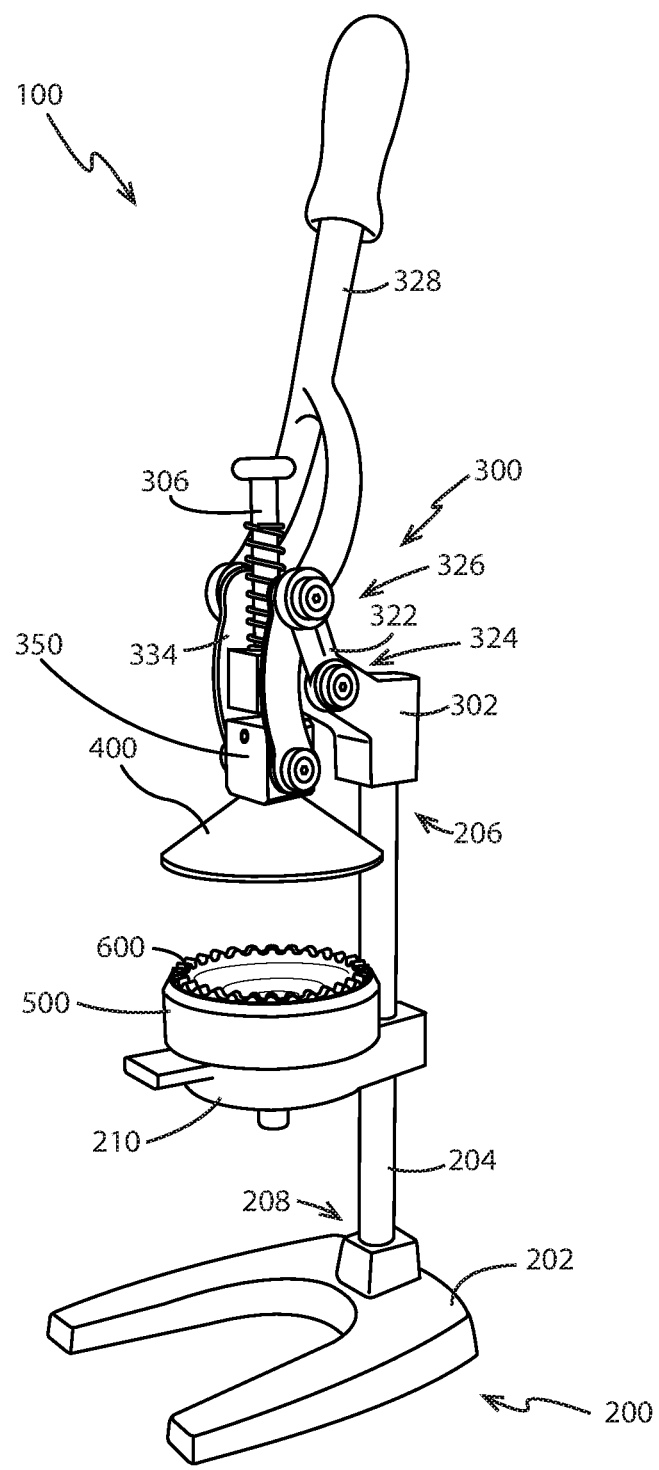
FIG. 1 is a perspective view of an embodiment of the present invention.
Figure 2:
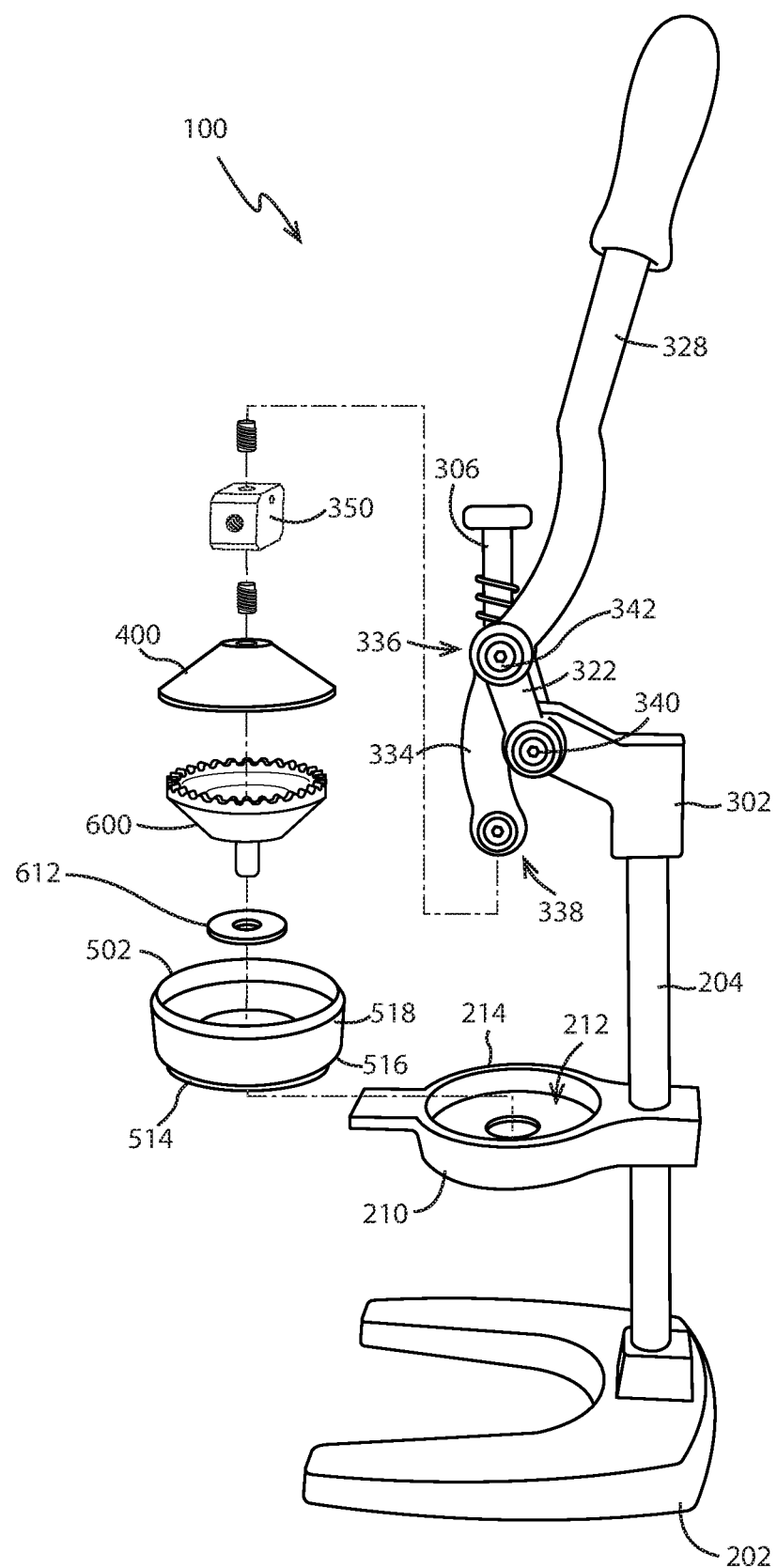
FIG. 2 is a partial exploded view of an embodiment of the present invention.
Figure 3:
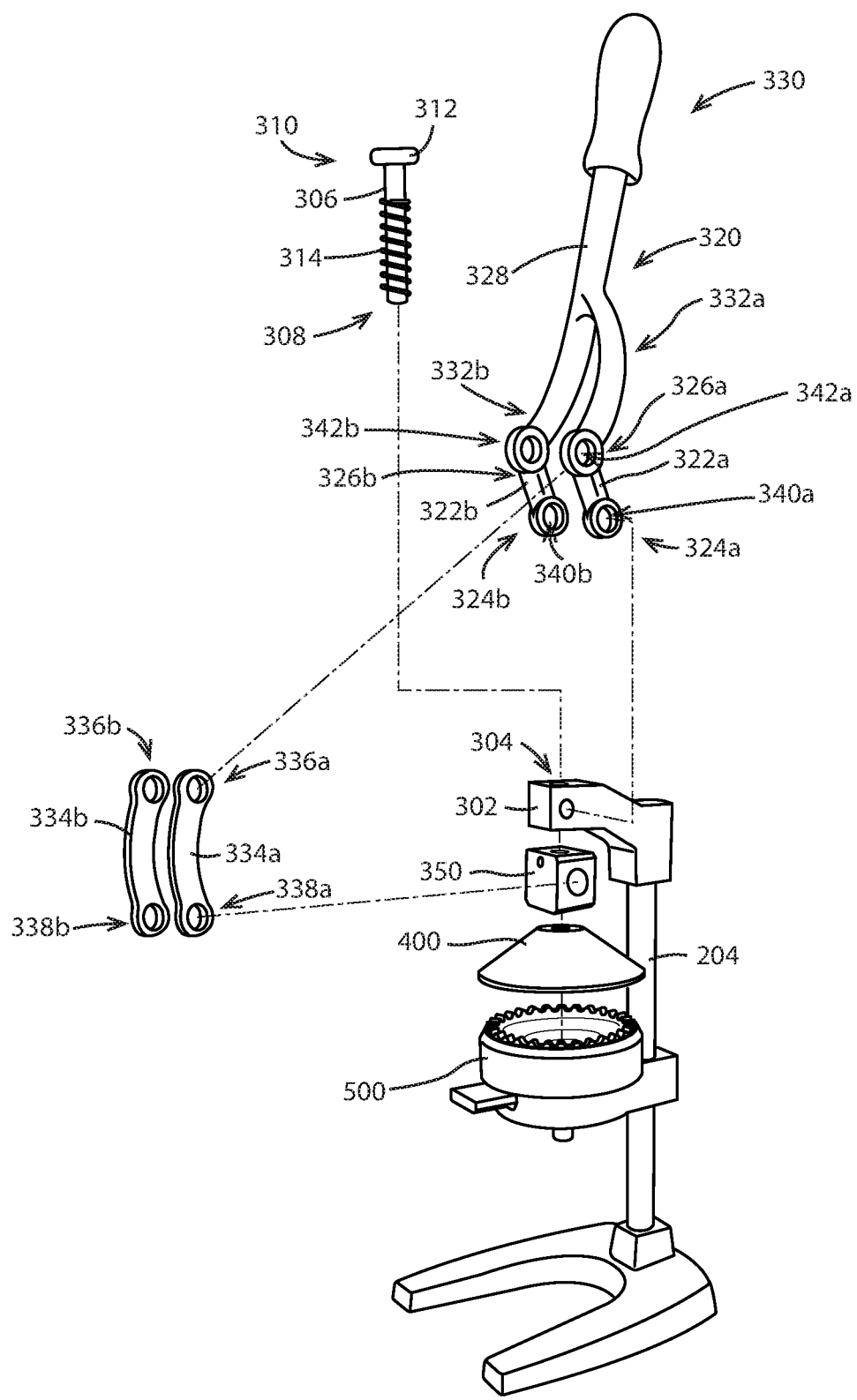
FIG. 3 is another partial exploded view of an embodiment of the present invention.
Figure 4:
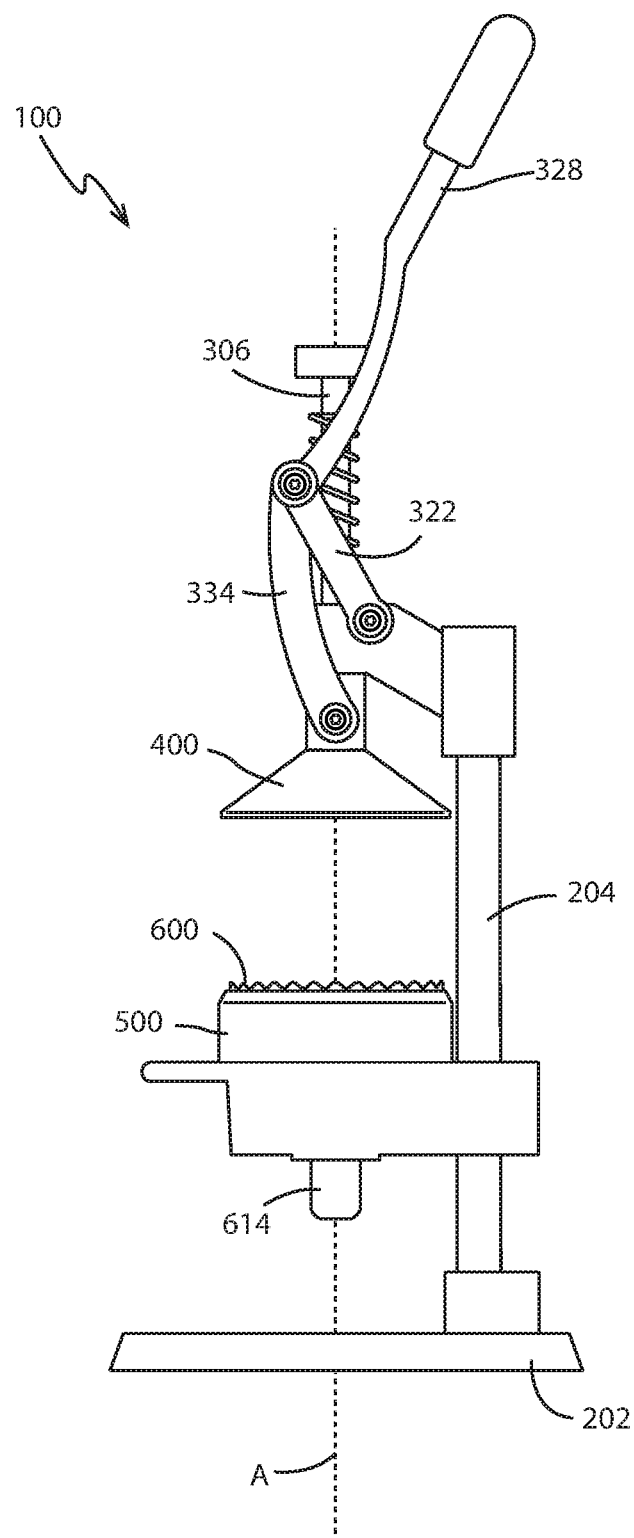
FIG. 4 is a side elevation view of an embodiment of the present invention.

The description set forth below in connection with the appended figures is intended as a description of presently-preferred embodiments of the invention and is not intended to represent the only forms in which the present invention may be constructed or utilized. The description sets forth the parts and functions of the invention, and the sequence of steps for operating the invention in connection with the illustrated embodiment(s). It is to be understood, however, that the same or equivalent functions and sequences may be accomplished by different embodiments that are also intended to be encompassed within the spirit and scope of the invention.

The invention of the present application is a sandwiching device 100 that can be used for making food items 10, such as sandwiches, pocket sandwiches, ravioli, calzones, and the like. The sandwiching device 100 is configured to compress two slices of bread together. In the preferred embodiment, the sandwiching device 100 seals the edges of the two slices to create a pocket sandwich. In another preferred embodiment, the sandwiching device 100 not only seals the edges of two slices of bread, but also, simultaneously cuts off the crust.

As shown in FIGS. 1-4, the sandwiching device 100 comprises a stand 200; a drive mechanism 300 operatively connected to the stand; a punch 400 operatively connected to the drive mechanism 300, wherein the drive mechanism 300 is configured to move the punch 400 from a raised configuration to a lowered configuration; a die 500 supported by the stand, the die 500 having a cutting perimeter edge 502, wherein the cutting perimeter edge 502 abuts against the punch 400 when the punch 400 is in the lowered configuration; and a sealer 600 having a sealing perimeter 602 configured so that when the punch 400 is in the lowered configuration, the sealing perimeter 602 abuts against the punch 400. In the preferred embodiment, the centers of the punch 400, the die 500, and the sealer 600 are coaxially aligned along a longitudinal axis A.

The stand comprises a base 202 and a post 204. The base 202 provides the foundation to keep the sandwiching device 100 upright. The post 204 can be any type of sturdy elongated member that can support the remaining components of the sandwiching device 100. In the preferred embodiment, the post 204 is generally an elongated, metal rod. As such, the post 204 has an upper end 206 and a lower end 208 opposite the upper end 206. The lower end 206 is attached to the base 202, and the upper end 206 is attached to the drive mechanism 300.

In some embodiments, the stand 200 further comprises a holder 210 attached to the post 204 between upper end 206 and the lower end 208, and is configured to hold the die 500. As such, the holder 210 may be a flat platform, a platform with an opening 212 into which at least a portion of the die 500 may be seated, a ring structure 214 into which a portion of the die 500 may be seated, and the like. The holder 210 may be adjustable in between the upper end 206 and the lower end 208 so as to adjust the height of the die 500.

The drive mechanism 300 is attached to the upper end 206 of the post 204 and is configured to move the punch 400 up and down from a raised configuration to a lowered configuration and back to the raised configuration. The drive mechanism 300 comprises a support structure 302 defining a guide hole 304. A guide bar 306 having a connector end 308 and a free end 310 may be inserted through the guide hole 304 to move up and down through the guide hole 304. The guide bar 306 and the guide hole 304 may be centered about the longitudinal axis A. The connector end 308 is attached to the punch 400. The free end 310 may have a flanged end 312. A spring 314 may be mounted about the guide bar 306 in between the support structure 302 and the flanged end 312. The spring 314 biases against the flanged end 312 and the support structure 302 to keep the guide bar 306 in a raised position, thereby placing the punch 400 in the raised configuration. Downward force upon the guide bar 306 lowers the guide bar 306 through the guide hole 304 to place the punch 400 in the lowered configuration.

In the preferred embodiment, a lever mechanism 320 is utilized to facilitate the lowering of the guide bar 306. For example, the lever mechanism 320 may comprises a link arm 322 having a medial end 324 and a lateral end 326 opposite the medial end 324, a lever arm 328 having a distal end 330 and a proximal end 332 opposite the distal end 330, and a punch drive 334 having a top end 336 and a bottom end 338 opposite the top end 336. The medial end 324 of the link arm 322 may be rotatably coupled to the support structure 302 by a fixed joint 340, and the lateral end 326 of the link arm 322 may be connected to the proximal end 332 of the lever arm 328 and the top end 336 of the punch drive 334 by a moving joint 342. Preferably, the lateral end 326 of the link arm 322 is integrally formed with the proximal end 332 of the lever arm 328 to form a single unit. The moving joint 342 allows for rotation of the top end 336 of the punch drive 334 relative to the lever arm 328 and the link arm 322, while permitting translational movement of the moving joint 342, in particular, in the upward and downward direction. The bottom end 338 of the punch drive 334 is connected to the connector end 308 of the guide bar 306 and to the punch 400. In this configuration, downward force on the distal end 330 of the lever arm 328 creates a multiplied force at the moving joint 342 causing the guide bar 306 to slide easily down through the guide hole 304, which lowers the punch 400. Release of force on the distal end 330 of the lever arm 328 allows the spring 314 to push against the flange 312 of the guide bar 306 causing the guide bar 306 to rise, which raises the lever arm 328 and the punch 400.

In the preferred embodiment, the proximal end 332 of the lever arm 328 branches in a wish-bone formation creating a pair of proximal ends 332a, 332b bilaterally arranged about the guide bar 306. Similarly, the pair of proximal ends 332a, 332b is attached to the top ends 336a, 336b of a pair of punch drives 334a, 334b by a pair of moving joints 342a, 342b, respectively (one proximal end attached to one top end by one moving joint) also bilaterally arranged about the guide bar 306. The pair of proximal ends 332a, 332b transitions into the lateral ends 326a, 326b of a pair of link arms 322a, 322b at their respective moving joints 342a, 342b, and the medial ends 324a, 324b of the pair of link arms 322a, 322b is connected to the support structure 302 by a pair of fixed joints 340a, 340b bilaterally arranged about the guide bar 306.

In some embodiments, a mounting block 350 may be provided for connecting the drive mechanism 300 to the punch 400. In the preferred embodiment, the mounting block 350 is a cube shaped structure, although many other shapes can be used, such as circular, oval, conical, cylindrical, and the like. In the preferred embodiment, the guide bar 306 is attached via the top of the mounting block 350, the pair of punch drives 334a, 334b are connected to opposite sides of the mounting block 350 and the punch 400 is connected to via the bottom of the mounting block 350 opposite the guide bar 306.

Figure 5:
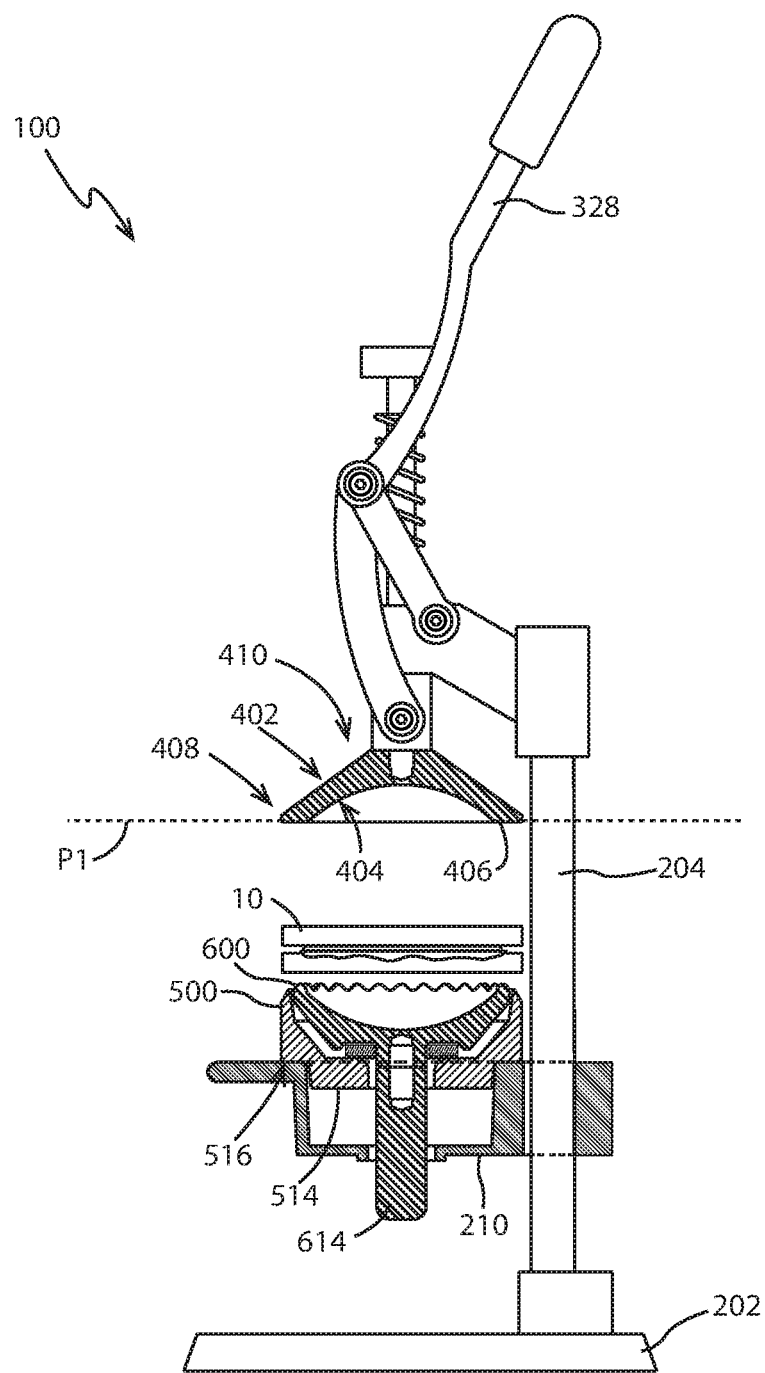
FIG. 5 is a side elevation view of an embodiment of the present invention with the lever in the raised configuration prior to sealing and de-crusting a sandwich, and showing several components in cross-section.
Figure 6:
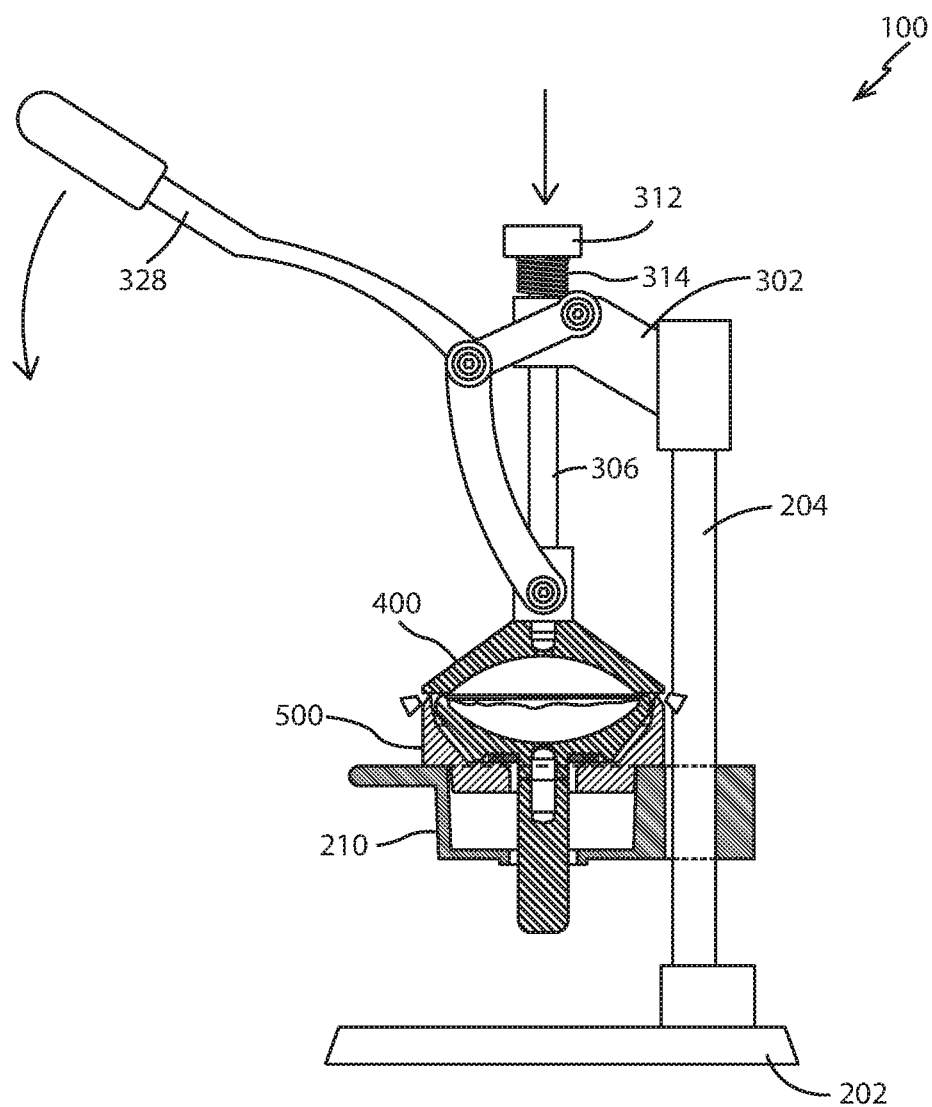
FIG. 6 is a side elevation view of an embodiment of the present invention with the lever in the lowered configuration, and showing several components in cross-section.
Figure 7:
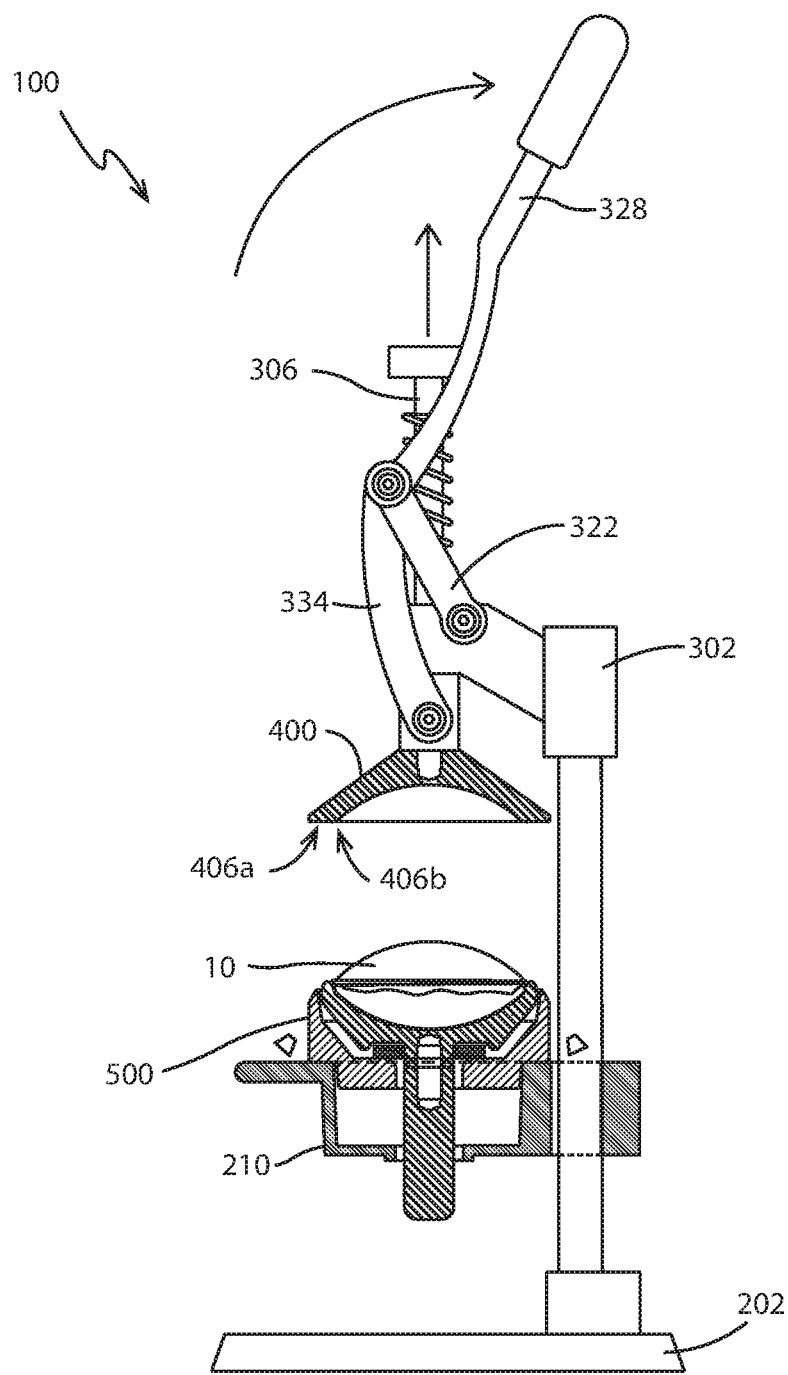
FIG. 7 is a side elevation view of an embodiment of the present invention with the lever in the raised configuration after sealing and de-crusting the sandwich, and showing several components in cross-section.
Figure 8:
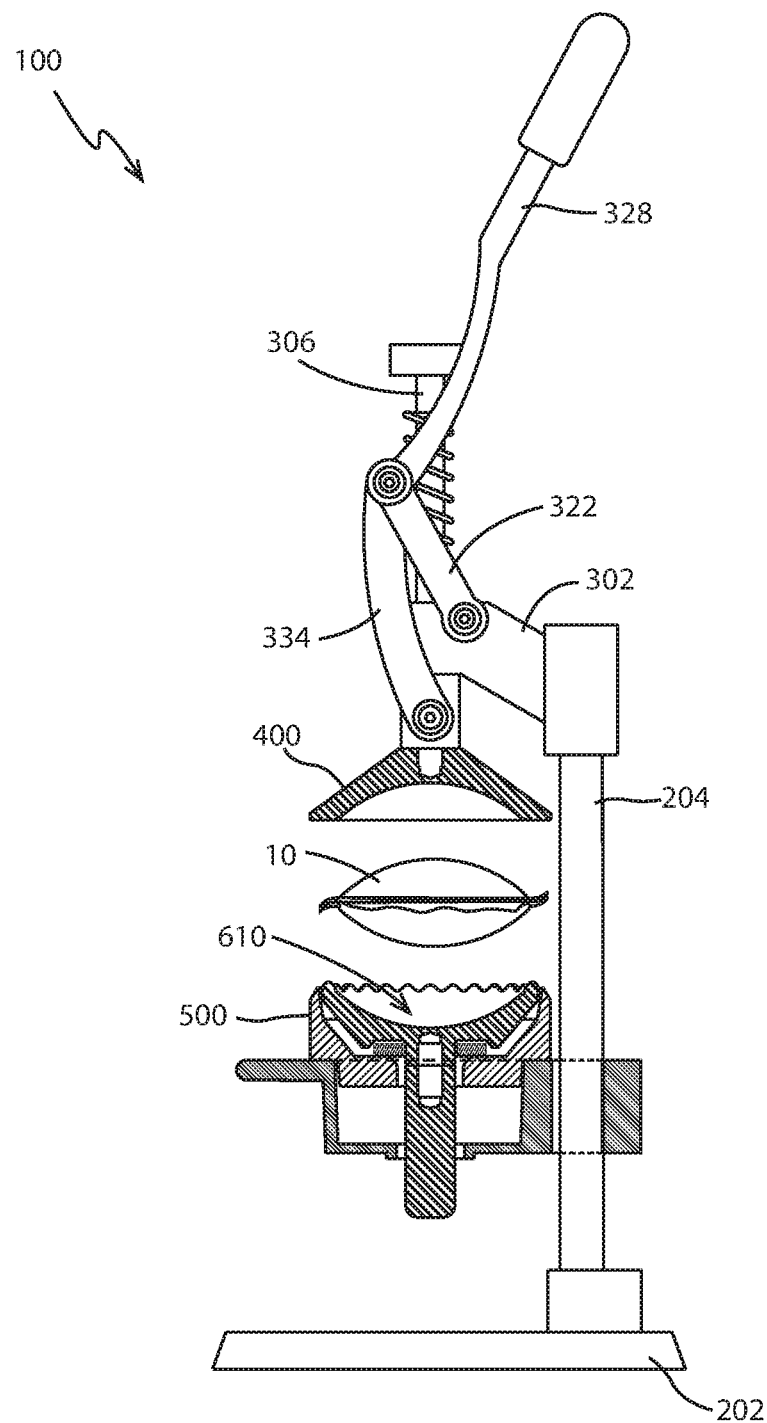
FIG. 8 is a side elevation view of an embodiment of the present invention with a lever in the raised configuration with the sandwich removed after sealing and de-crusting the sandwich, and showing several components in cross-section.
Figure 9:
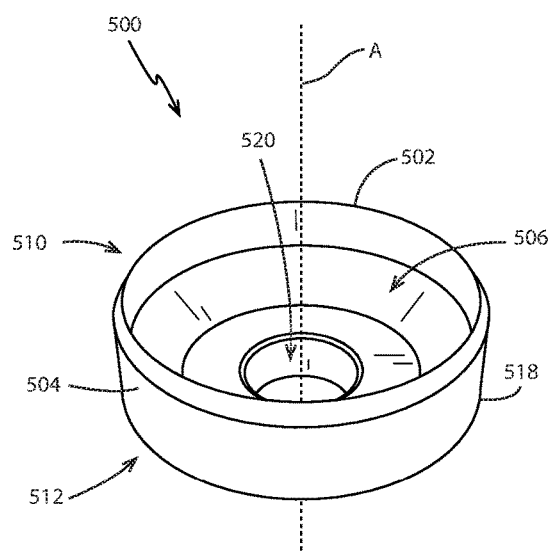
FIG. 9 is a perspective view of an embodiment of the die.
Figure 10:
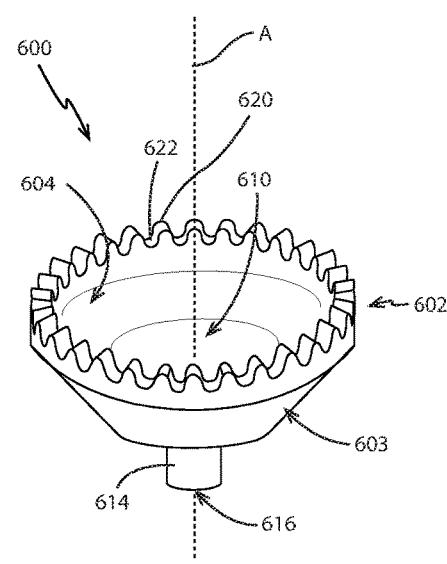
FIG. 10 is a perspective view of an embodiment of the sealer.
Figure 11:
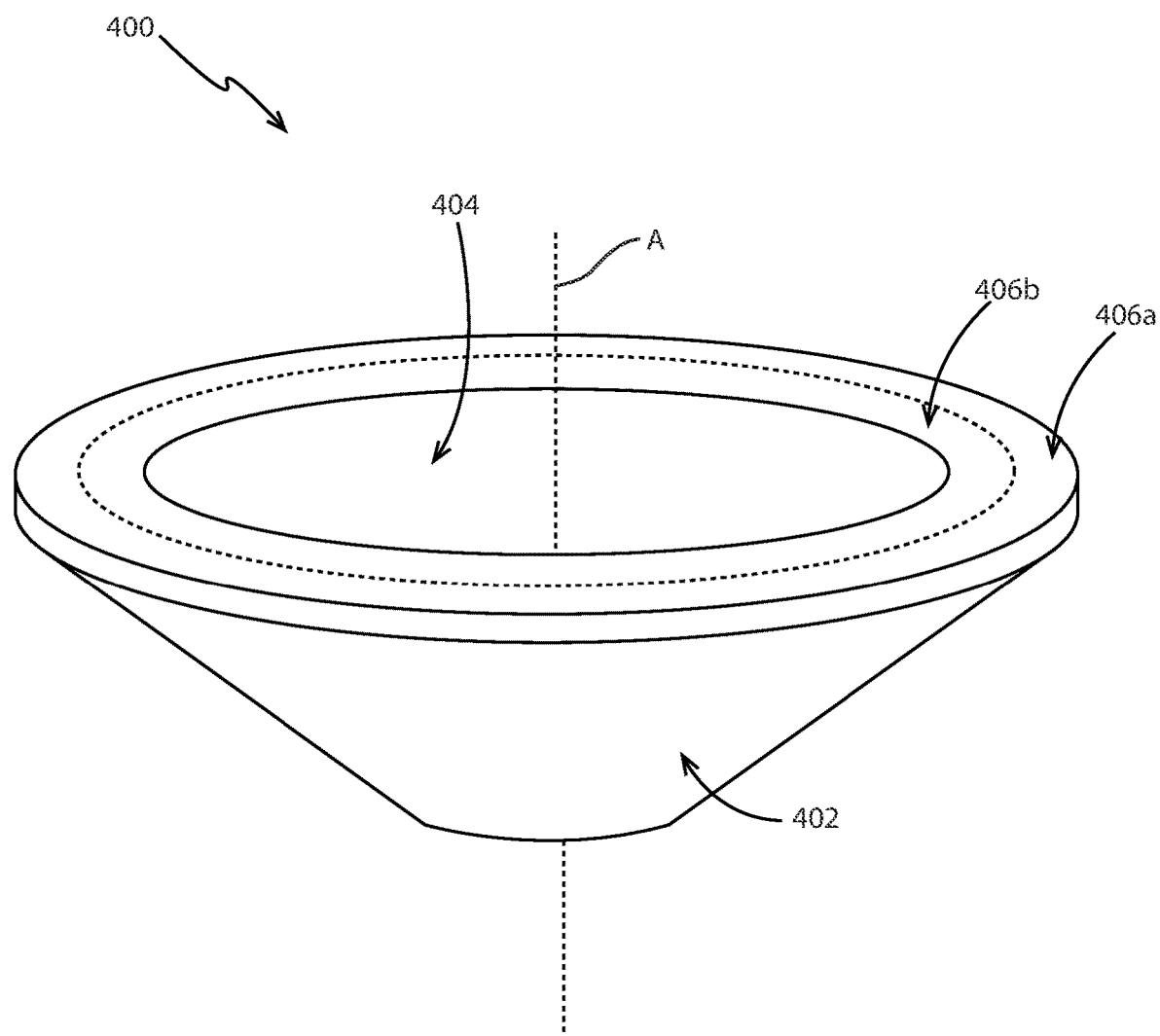
FIG. 11 is a perspective view of an embodiment of the punch.

As shown in FIGS. 5 and 11, the punch 400 has an outer surface 402 and an inner surface 404 opposite the outer surface, the outer and inner surfaces 402, 404 meeting at a flat rim 406. The flat rim 406 defines a first plane P1. In the preferred embodiment the inner surface 404 of the punch 400 is dome-shaped. As such, the inner surface 404 is concave relative to the first plane P1. In other words, the inner surface 404 curves away from the first plane P1.

The outer surface 402 of the punch 400 may be tapered moving away from the first plane P1. In the preferred embodiment, the outer surface 402 is frustoconical in shape with a bottom portion 408 being defined by the flat rim 406. The top portion 410 of the punch 400 is connected to the drive mechanism 300, for example, via the mounting block 350.

As shown in FIGS. 5-9, the die 500 performs two major functions. First, the die 500 comprises a cutting edge 502 to cut the foodstuff against the punch 400. Second, the die 500 is configured to house the sealer 600. In the preferred embodiment, the die 500 is a cylindrical cup-like structure defined by a cylindrical wall 504 and having a die interior 506. The die interior 506 and the cylindrical wall 504 converge into the sharp, perimeter, cutting edge 502 at the top portion 510 of the die 500. A bottom portion 512 of the die 500 is configured to be mounted on the holder 210. If the holder 210 is a ring or has an opening, such as a recessed portion or through hole, then the bottom portion 512 of the die 500 may have a protrusion 514 extending the from the bottom portion 512 of the die 500 that defines a lip 516 along the perimeter edge 518 of the bottom portion 512 of the die 500 configured to be seated within the ring or opening of the holder 210 so as to prevent horizontal, translational movement of the die 500. When the punch 400 is in the lowered configuration, the cutting perimeter edge 502 abuts against an outer rim portion 406a of the flat rim 406 of the punch 400 essentially pinching any foodstuff caught in between the cutting perimeter edge 502 and the outer rim portion 406a.

As shown in FIGS. 5-8 and 10, the sealer 600 is sturdy piece of material that can withstand the forces applied by the punch 400. As such, the sealer 600 (and the other components of the invention) may be made out of metal, plastic, wood, carbon fiber, and the like. In the preferred embodiment, the sealer 600 has an outer surface 603 and an inner surface 604 opposite the outer surface 603, the outer and inner surfaces 603, 604 meeting at a perimeter edge 602. The outer surface 603 is configured so as to fit inside the die 500. In other words, the sealer 600 is configured to be seated within the die 500. The perimeter edge 602 is configured to abut against the punch 400 causing any foodstuff therebetween to be pressed together. Depending on the nature of the foodstuff, the foodstuff can stick together when pressed with sufficient force. Therefore, the perimeter edge 602 is a sealing perimeter edge. For example, if two slices of bread were pressed in between the punch and the sealing perimeter edge, the two slices of bread would essentially stick together due to the nature of bread material.

The sealing perimeter edge 602 may be flat so that when abutted against the punch 400, the punch 400 and the sealing perimeter edge 602 lay flat against each other. In the preferred embodiment, the sealing perimeter edge 602 may be scalloped with undulating contours defining peaks 620 and valleys 622. Although sharp, teeth-like or gear-like undulations can be used, foodstuff tends to get caught in between the sharp corners. As such, in the preferred embodiment, the undulations are smooth in the shape of a sinusoidal wave when viewed in profile or elevation view. Although the inner perimeter rim 406b of the punch 400 can have reciprocal undulations to mate with the sealing perimeter edge 602, in the preferred embodiment, the inner perimeter rim 406b is flat so that only the peaks 620 of the undulating contours abut against the inner perimeter rim 406b of the punch 400. This configuration causes the foodstuff between the inner perimeter rim 406b and the sealing perimeter edge 406 to be crimped. The crimping creates a better seal in the foodstuff, allows the foodstuff to be released more easily from the sealer 600, and better maintains the inner contents of the foodstuff.

In some embodiments, the sealer 600 may have a concave interior surface 610. Therefore, the sealer 600, the punch 400, or both can have a concave interior surface. In the preferred embodiment, both the punch 400 and the sealer 600 have concave interior surfaces 404, 610. When the punch 400 and the sealer 600 are pressed together, the concave interior surfaces 404, 610 create a pocket reducing the possibility of having the inner contents of the foodstuff from being squeezed out. For example, if the user was creating a sandwich, the user might have meats, spreads (such as peanut butter and jelly), creams, cheeses, fruits, vegetables, and the like as the inner contents in between two slices of bread. If pressed between to flat plates, the inner contents could spill out or rip through the bread. In some instances, the inner contents can be pushed to the perimeter edges of the punch 400 and the sealer 600 and interfere with the sealing of the two bread slices together. With concave interior surfaces 404, 610 facing each other, a dome shape pocket is created and less pressure is applied against the main body of the foodstuff, while significant force is applied to the perimeter edges of the foodstuff.

In the preferred embodiment, the sealing perimeter edge 602 and the inner rim 406b of the punch 400 may be circular in shape. A circular shape is the easiest shape to use because the circular nature keeps the sealer 600 and the punch 400 in perfect alignment regardless of the rotational alignment of the sealer 600 and the punch. Other shapes would require the punch 400 and the sealer 600 to be aligned in a particular configuration. Nonetheless, any other shape can also be used, such as any number of sided polygons, stars, hearts, ovals, animals, characters, and the like, albeit with potentially less efficiency. The circular, dome shape configuration also allows for a more even distribution of the ingredients inside the foodstuff, due to the equidistant radius a circle creates in all directions from the center to its edge. Other shapes could lead to uneven distribution. For example, with a square shape, the ingredients will reach one edge but perhaps not proportionately fill its corners.

In some embodiments, the sandwiching device 100 may further comprise a resilient device 612 biased against outer surface 602 of the sealer 600 and the die interior 506 to cause the sealing perimeter edge 602 to rise above the cutting perimeter edge 502 when the punch 400 is in the raised configuration. When force is applied to the sealer 600, the resilient die 612 is compressed allowing the sealer 600 to descend further into the die interior 506. In practice, the force applied is from the punch 400. When the punch 400 abuts against the cutting edge 502 of the die 500, the punch 400 can no longer descend, and the perimeter sealing edge 602 of the sealer 600 would essentially be at the same level as the cutting edge 502 of the die 500, thereby cutting and sealing any foodstuff in between the punch 400, the cutting perimeter edge 502, and the sealing perimeter edge 602. When the punch 400 is raised, the force against the sealer 600 is removed and the resilient device 612 forces the sealer 600 in the upward direction lifting the foodstuff away from the cutting perimeter edge 502 of the die 500. This allows the foodstuff to be easily removed from the sandwiching device 100. The resilient device 612 may be a spring, an elastomeric pad, foam, rubber, and the like, so that the resilient device can be compressed and return to its original state.

In some embodiments, the sealer 600 comprises a protrusion 614 located at a center 616 of the sealer 600 and projecting axially away from the sealing perimeter edge 602. The resilient device 612 may be connected to the protrusion 614 and biased against the die interior 506. In some embodiments, the die 500 may define a central opening 520 through which the protrusion 614 can be inserted. The central opening 520 may be large enough to allow the protrusion 614 to pass through, but not the resilient device 612. This allows the sealer 600 to move up and down within the die 500, while allowing the resilient device 612 to be biased against the die 500 to create an upward force against the sealer 600. The upward force against the sealer allows the sealing perimeter edge 602 to be elevated slightly higher than the cutting edge 502 of the die 500.

In use, the user places the lever arm 328 and the raised configuration. When the lever or 328 is in the raised configuration, the punch 400 is also in the raised configuration. This creates a gap in between the punch 400 and the die 500. The perimeter sealing edge 602 of the sealer 600 floats above the cutting edge 502 of the die. A food product 10, such as a sandwich, is assembled with, for example, two slices of bread and additional food items there between. The assembled food product 10 is placed on top of the sealer 600 in a manner that allows the outer edges of the food product 10 to overhang beyond the cutting edge 502 of the die. The user then applies a downward force on the lever arm 328 causing the lever arm 328 to move toward the lowered configuration. Due to the configuration of the lever mechanism 320, the downward force applied at the lever arm 328 is multiplied at the punch drive 334. The punch drive 334 is connected to the guide bar 306, thereby transferring the downward force on the punch drive 334 to the guide bar 306. Due to the multiplied force on the punch drive 334, a downward force on the lever arm 328 easily overcomes the upward force encountered by the spring 314 mounted on the guide bar 306 and biased against the flange 312. This allows the punch 400 to descend towards the die 500 to the lower configuration. The inner rim 406*b* of the punch 400 encounters the sealing perimeter edge 602 of the sealer 600 with the food product 10, therebetween. As the punch 400 continues to lower, the food product 10 caught in between the inner rim 406*b* and the sealing perimeter edge 602 becomes crimped. The force applied to the sealing perimeter edge 602 by the punch 400 eventually overrides the opposing force of the resilient device 612 causing the sealer 600 to descend further into the die interior 506. The outer rim 406*a* of the punch 400 eventually abuts against the cutting edge 502 of the die 500 with the perimeter edge of the food product 10 caught therebetween. The outer rim 406*a* pinches the food product 10 against the cutting edge 502 essentially cutting off the perimeter edge of the food product 10. Therefore, with one action of the lever arm 328, the food product is both sealed and de-crusted essentially at the same time. The user then raises the lever arm 328 back to its raised configuration to remove the force of the punch 400 against the die 500 and the sealer 600. The resilient device 612 pushes the sealer 600 in the upward direction causing the food product 10 to lift off of the cutting edge 502 of the die. The food product 10 is more readily accessible and can be easily removed from the sealer 600.

The foregoing description of the preferred embodiment(s) of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

The invention claimed is:

1. A sandwiching device, comprising:
 a) a stand, comprising a base, a post, and a holder, the post having an upper end and a lower end opposite the upper end, the lower end attached to the base, the holder attached to the post between upper end and the lower
 b) a drive mechanism attached to the upper end of the post, the drive mechanism comprising:
  (i) a support structure defining a guide hole;
  (ii) a link arm having a medial end and a lateral end opposite the medial end,
  (iii) a lever arm having a distal end and a proximal end opposite the distal end,
  (iv) a punch drive having a top end and a bottom end opposite the top end, and
  (v) a guide bar having a connector end and a free end opposite the connector end, wherein the medial end of the link arm is rotatably coupled to the support structure by a fixed joint, wherein the lateral end of the link arm is connected to the proximal end of the lever arm and the top end of the punch drive by a moving joint, wherein the bottom end of the punch drive is connected to the connector end of the guide bar, and wherein the guide bar is inserted in the guide hole to slide up and down through the guide hole when the lever arm is raised and lowered, respectively;

c) a punch connected to the drive mechanism for moving the punch from a raised configuration to a lowered configuration, the punch having an outer surface attached to the bottom end of the punch drive, a flat rim defining a plane, and a dome-shaped interior having a concave interior surface facing the plane;

d) a die having a cutting perimeter edge and a die interior, wherein the cutting perimeter edge abuts against an outer rim portion of the flat rim of the punch when the punch is in the lowered configuration, the die seated in the holder;

e) a sealer having an outer surface, a scalloped perimeter edge, and a concave interior surface, the outer surface configured to be seated within the die interior such that when the punch is in the lowered configuration, the scalloped perimeter edge abuts against an inner rim portion of the flat rim of the punch, wherein the outer surface of the sealer comprises a protrusion located at a center of the sealer and projecting away from the scalloped perimeter edge, wherein the scalloped perimeter edge comprises a sinusoidal profile; and f) a resilient device attached to the protrusion and positioned against the die interior to cause the scalloped perimeter edge to rise above the cutting perimeter edge when the punch is in the raised configuration, but capable of being compressed to allow the sealer to be pressed downwardly.

2. A sandwiching device, comprising:
a) a stand;
b) a drive mechanism operatively connected to the stand;
c) a punch operatively connected to the drive mechanism, wherein the drive mechanism is configured to move the punch from a raised configuration to a lowered configuration;
d) a die supported by the stand, the die having a cutting perimeter edge, wherein the cutting perimeter edge abuts against the punch when the punch is in the lowered configuration;
e) a sealer having a scalloped perimeter edge and configured so that when the punch is in the lowered configuration, the scalloped perimeter edge abuts against the punch; and
f) a resilient device biased against the sealer and the die to cause the scalloped perimeter edge to rise above the cutting perimeter edge when the die is in the raised configuration.

3. The sandwiching device of claim 2, wherein the scalloped perimeter edge comprises a sinusoidal profile.

4. The sandwiching device of claim 3, wherein at least one of punch or the sealer has a concave interior surface.

5. The sandwiching device of claim 3, wherein the punch has a first concave interior surface and the sealer has a second concave interior surface, the punch and the sealer configured so that when the punch is in the lowered configuration, the first concave interior surface and the second concave interior surface create a pocket.

6. The sandwiching device of claim 5, wherein the punch comprises a flat rim, wherein when the punch is in the lowered configuration, the cutting perimeter edge abuts against an outer portion of the flat rim of the punch, and the scalloped perimeter edge abuts against an inner portion of the flat ring of the punch.

7. The sandwiching device of claim 6, wherein the sealer comprises a protrusion located at a center of the sealer and projecting away from the scalloped perimeter edge, wherein the resilient device is connected to the protrusion and biased against an interior surface of the die.

8. The sandwiching device of claim 7, wherein die comprises a central hole through which the protrusion can pass to allow the resilient device to be compressed.

9. The sandwiching device of claim 8, wherein the drive mechanism, comprises:
a) a link arm having a medial end and a lateral end opposite the medial end,
b) a lever arm having a distal end and a proximal end opposite the distal end,
c) a punch drive having a top end and a bottom end opposite the top end, and
d) a guide bar having a connector end and a free end opposite the connector end, wherein the medial end of the link arm is connected to an upper end of the stand by a fixed joint, wherein the lateral end of the link arm is connected to the proximal end of the lever arm and the top end of the punch drive by a moving joint, wherein the bottom end of the punch drive is connected to the connector end of the guide bar, and wherein the guide bar is inserted in a guide hole defined at the upper end of the stand to slide up and down through the guide hole when the lever arm is raised and lowered, respectively, wherein the guide bar comprises a flange at the free end, wherein a spring is mounted on the guide bar in between the flange and the upper end of the stand to impose a biasing force against the flange to bias the guide bar upwardly.

10. The sandwiching device of claim 9, further comprising a mounting block connected to the connector end of the guide bar, the bottom end of the punch drive, and an outer surface of the punch.

11. A sandwiching device, comprising:
a) a stand;
b) a drive mechanism operatively connected to the stand;
c) a punch operatively connected to the drive mechanism, wherein the drive mechanism is configured to move the punch from a raised configuration to a lowered configuration;
d) a die supported by the stand, the die having a cutting perimeter edge, wherein the cutting perimeter edge abuts against the punch when the punch is in the lowered configuration;
e) a sealer having a sealing perimeter edge and configured so that when the punch is in the lowered configuration, the sealing perimeter edge abuts against the punch, the sealer configured to be seated within the die; and
f) a resilient device biased against the sealer and the die to cause the sealing perimeter edge to rise above the cutting perimeter edge when the die is in the raised configuration.

12. The sandwiching device of claim 11, wherein at least one of the punch or the sealer has a concave interior surface.

13. The sandwiching device of claim 11, wherein the punch has a first concave interior surface and the sealer has a second concave interior surface, the punch and the sealer configured so that when the punch is in the lowered configuration, the first concave interior surface and the second concave interior surface create a pocket.

14. The sandwiching device of claim 11, wherein the punch comprises a flat r herein when the punch is in the lowered configuration, the cutting perimeter edge abuts against outer rim portion of the flat rim of the punch, and the sealing perimeter edge abuts against an inner rim portion of the flat rim of the punch.

15. A sandwiching device, comprising:
a) a stand;
b) a drive mechanism operatively connected to the stand;
c) a punch operatively connected to the drive mechanism, wherein the drive mechanism is configured to move the punch from a raised configuration to a lowered configuration;
d) a die supported by the stand, the die having a cutting perimeter edge, wherein the cutting perimeter edge abuts against the punch when the punch is in the lowered configuration;
e) a sealer having a sealing perimeter edge and configured so that when the punch is in the lowered configuration, the sealing perimeter edge abuts against the punch, the sealer configured to be seated within the die, wherein the sealer comprises a protrusion located at a center of the sealer and projecting away from the sealing perimeter edge, wherein a resilient device is connected to the protrusion and biased against an interior surface of the die.

16. The sandwiching device of claim 15, wherein die comprises a central hole through which the protrusion pass to allow the resilient device to be compressed.

17. The sandwiching device of claim 11, wherein the drive mechanism, comprises:
a) a link arm having a medial end and a lateral end opposite the medial end,
b) a lever arm having a distal end and a proximal end opposite the distal end,
c) a punch drive having a top end and a bottom end opposite the top end, and
d) a guide bar having a connector end and a free end opposite the connector end, wherein the medial end of the link arm is connected to an upper end of the stand by a fixed joint, wherein the lateral end of the link arm is connected to the proximal end of the lever arm and the top end of the punch drive by a moving joint, wherein the bottom end of the punch drive is connected to the connector end of the guide bar, and wherein the guide bar is inserted in a guide hole defined at the upper end of the stand to slide up and down through the guide hole when the lever arm is raised and lowered, respectively, wherein the guide bar comprises a flange at the free end, wherein a spring is mounted on the guide bar in between the flange and the upper end of the stand to impose a biasing force against the flange to bias the guide bar upwardly.

18. The sandwiching device of claim 17, further comprising a mounting block connected to the connector end of the guide bar, the bottom end of the punch drive, and an outer surface of the punch.

* * * * *